United States Patent [19]

Morales et al.

[11] Patent Number: 4,847,837
[45] Date of Patent: Jul. 11, 1989

[54] LOCAL AREA NETWORK WITH FAULT-CHECKING, PRIORITIES AND REDUNDANT BACKUP

[75] Inventors: Sergio Morales, Glendale; Gary L. Friedman, Encino, both of Calif.

[73] Assignee: The United States of America as represented by the Administrator of the National Aeronautics and Space Administration, Washington, D.C.

[21] Appl. No.: 927,987

[22] Filed: Nov. 7, 1986

[51] Int. Cl.⁴ .............................................. G06F 11/16
[52] U.S. Cl. .......................................... 371/8; 370/16
[58] Field of Search .............................. 371/8, 11, 29; 340/825.01, 825.05, 825.16; 370/86, 88, 89, 90; 455/8, 9, 16

[56] References Cited

U.S. PATENT DOCUMENTS

| | | | |
|---|---|---|---|
| 4,159,470 | 6/1979 | Strojny | 371/8 |
| 4,575,842 | 3/1986 | Katz | 340/825.01 X |
| 4,627,045 | 12/1986 | Olson | 371/8 X |
| 4,648,088 | 3/1987 | Cagle | 371/8 X |
| 4,658,396 | 4/1987 | Barden | 370/16 |

Primary Examiner—Jerry Smith
Assistant Examiner—Robert W. Beausoliel
Attorney, Agent, or Firm—Thomas H. Jones; John R. Manning; Charles E. B. Glenn

[57] ABSTRACT

A redundant error-detecting and correcting local area networked computer system (10) having a plurality of nodes (16) each including a network connector board (20') for connecting to an interfacing transceiver (18) attached to a network cable (12, 14). The system comprises a first network cable (12) disposed along a path to interconnect the nodes. The first cable includes a plurality of first interfacing transceivers. A second network cable (14) includes a plurality of second interfacing transceivers. A plurality of three position switches (48) each having a signal input, three outputs for individual selective connection to the input, and a control input for receiving signals designating which of the outputs is to be connected to the signal input are provided. Master switch (50) is provided for receiving directive signals for outputting addressed switch position signals to the three position switches. Finally, there is a monitor and control computer (30) for monitoring the status of the networked computer system by sending messages to the nodes and receiving and verifying messages therefrom and for sending control signals to the master switch to cause the master switch to cause respective ones of the nodes to use a desired one of the first and second cables for transmitting and receiving messages and for disconnecting desired ones of the nodes from both cables.

39 Claims, 6 Drawing Sheets

LOCAL AREA NETWORK WITH FAULT-CHECKING, PRIORITIES AND REDUNDANT BACKUP

ORIGIN OF THE INVENTION

The invention described herein was made in the performance of work under a NASA contract and is subject to the provisions of Public Law 96-517 (35 USC 202) in which the Contractor has elected not to retain title.

TECHNICAL FIELD

The present invention relates to local area networks and, more particularly, to a local area network having the ability to find, isolate, and aid in the correction of network faults. In particular, it relates to a redundant error-detecting and correcting local area networked computer system having a plurality of nodes each including a network connector board within the node for connecting to an interfacing transceiver operably attached to a network cable and comprising a first network cable disposed along a path to interconnect the nodes, the first network cable including a plurality of first interfacing transceivers attached thereto; a second network cable disposed in combination with the first cable, the second network cable including a plurality of second interfacing transceivers attached thereto; a plurality of three position switches each having a signal input, three outputs for individual selective connection to the input, and a control input for receiving signals designating which of the outputs is to be connected to the signal input, each of the switches including means for designating a response address for responding to addressed signals appearing at the control input, each of the switches further having its signal input connected to a respective one of the input/output lines from the nodes, one of the three outputs being connected to a respective one of the plurality of first interfacing transceivers, and another of the three outputs being connected to a respective one of the plurality of second interfacing transceivers; master switch control means having an output connected to the control inputs of the plurality of three position switches and an input for receiving directive signals for outputting addressed switch position signals to the three position switches; and, monitor and control computer means having a pair of network connector boards therein connected to respective ones of one of the first interfacing transceiver and one of the second interfacing transceivers and an output connected to the input of the master switch means for monitoring the status of the networked computer system by sending messages to the nodes and receiving and verifying messages therefrom and for sending control signals to the master switch to cause the master switch to cause respective ones of the nodes to use a desired one of the first and second cables for transmitting and receiving messages and for disconnecting desired ones of the nodes from both cables.

DESCRIPTION OF THE PRIOR ART

The networking of workstations, nodes, and other computer entities has grown rapidly in user acceptance. So called "local area networks" (LAN's) come in numerous configurations. There are straight lines, stars, and rings or loops. Regardless of the type of physical cabling (electrical, shielded coaxial, fiber optic, or the like) the end result is the same. The computers are individually hooked to the LAN through an interface by which they can put messages onto the LAN and read messages from the LAN.

Despite high interest in and acceptance of LANs, the technology has grown with tunnel vision; that is, much energy has been devoted to the technology of the electronics and the software associated with the LAN and its use but virtually no effort has been expended in monitoring and controlling the moment-to-moment health of the LAN so as to prevent errors and downtime.

The use of redundant LANs is old in the art. Other electronic and telecommunications applications employed redundant cabling for backup capabilities and, therefore, it was a logical extension to apply this technology to LANs. In a ring or loop LAN, communications are only in one direction so duplex operation is not a consideration. In non-looped networks, the use of a pair of single-direction cables (i.e., one for transmitting and one for receiving) has been a common approach to eliminating duplex mode considerations.

Despite the modern technology of electronics and software which has been developed, prior art LANs depend on user dissatisfaction and stone axe approaches to discover problems with the LAN and to effect isolation and correction thereof. As individual users notice erroneous or strange behavior at their workstation, they call the central service department to inquire as to whether not there are problems with the network. A multitude of calls alerts the service department that there may be a problem somewhere on the network. The type of complaints and locality of the complained about workstations gives a first indication of a probable source of the problem, if any. A service engineer is then dispatched to the area to attempt to isolate, identify, and solve the problem. Few tools are available to the service engineer to isolate LAN problems; typically, each node is removed one by one until the problem (hopefully) goes away. Because these blind trouble shooting techniques are the only ones available, the duration of the LAN's down time can never be predicted. As can be realized, such an approach is far from satisfactory—particularly in applications of a critical nature.

A typical prior art LAN having redundant backup capability is shown in FIG. 1. The network, generally indicated as 10, comprises two LAN cables 12, 14, labelled "LAN1" "LAN2", respectively. A plurality of workstations 16 are attached to LANs 12, 14 by interfacing transceivers 18. Each workstation 16 has a pair of network interface boards 20, 22 for connecting to respective ones of the LAN cables 12, 14. An internet router 24 is also provided for communicating with other LANs (not shown). The internet router 24 also includes network interfacing boards 20, 22 connecting the LANs 12, 14 with interfacing transceivers 18. Additionally, the internet router 24 connects to a pair of modems 26 which are connected to the other networks (not shown) through lines 28.

In this prior art configuration, it is proposed to have a system monitoring computer (SMC) 30 including network interfacing transceiver boards 20, 22 and connected to respective ones of the LANs 12, 14 in order to monitor the status of the network 10. Unfortunately, in a configuration such as that shown in FIG. 1, there is very little the SMC 30 could do in the way of monitoring and acting on the health of the network. Moreover, computers incorporating two network interfacing transceiver boards such as 20 and 22 are rare if they exist at all. Obviously, more space and expense is required for duplicate boards. To employ such a duplicate configuration in each computer element of the network would be difficult at best. Additionally, the associated software for interfacing with the network becomes much more complicated and prone to errors since multiple addresses for inputting and outputting must now be employed and maintained. Many times, each backup interfacing transceiver board 20, 22 must be put into action manually, via software commands, making for a slow transition (especially if the LAN spans several floors and/or several buildings) which does not guarantee system recovery.

Thus, while there are redundant LANs and attempts to monitor them, there is no LAN configuration in the art having simplified software and electronics in the existing equipment which allows for continuous monitoring of the health of the network. Likewise, there is no LAN which can rapidly identify the existence of a fault or error condition in the network, isolate it, and alert service personnel to the existence and location of the problem so that it can be rapidly resolved.

DISCLOSURE OF THE INVENTION

This invention is a redundant error-detecting and correcting local area networked computer system having a plurality of nodes each including a network connector board within the node for connecting to an interfacing transceiver operably attached to a network cable. There is a first network cable disposed along a path to interconnect the nodes. The first network cable includes a plurality of first interfacing transceivers attached thereto. A second network cable is disposed in parallel with the first cable and, in like manner, includes a plurality of second interfacing transceivers attached thereto. There are a plurality of three position switches each having a signal input, three outputs for individual selective connection to the input, and a control input for receiving signals designating which of the outputs is to be connected to the signal input. Each of the switches includes means for designating a response address for responding to addressed signals appearing at the control input and each of the switches further has its signal input connected to a respective one of the input/output lines from the nodes. Also, one of the three outputs is connected to a respective one of the plurality of first interfacing transceivers, and another of the three outputs is connected to a respective one of the plurality of second interfacing transceivers. There is master switch control means having an output connected to the control inputs of the plurality of three position switches and an input for receiving directive signals for outputting addressed switch position signals to the three position switches as well as monitor and control computer means having a pair of network connector boards therein connected to respective ones of one of the first interfacing transceivers and one of the second interfacing transceivers and an output connected to the input of the master switch means for monitoring the status of the networked computer system by sending messages to the nodes and receiving and verifying messages therefrom and for sending control signals to the master switch to cause the master switch to cause respective ones of the nodes to use a desired one of the first and second cables for transmitting and receiving messages and for disconnecting desired ones of the nodes from both cables.

DETAILED DESCRIPTION OF THE DRAWINGS

DETAILED DESCRIPTION OF THE INVENTION

Figure 1:
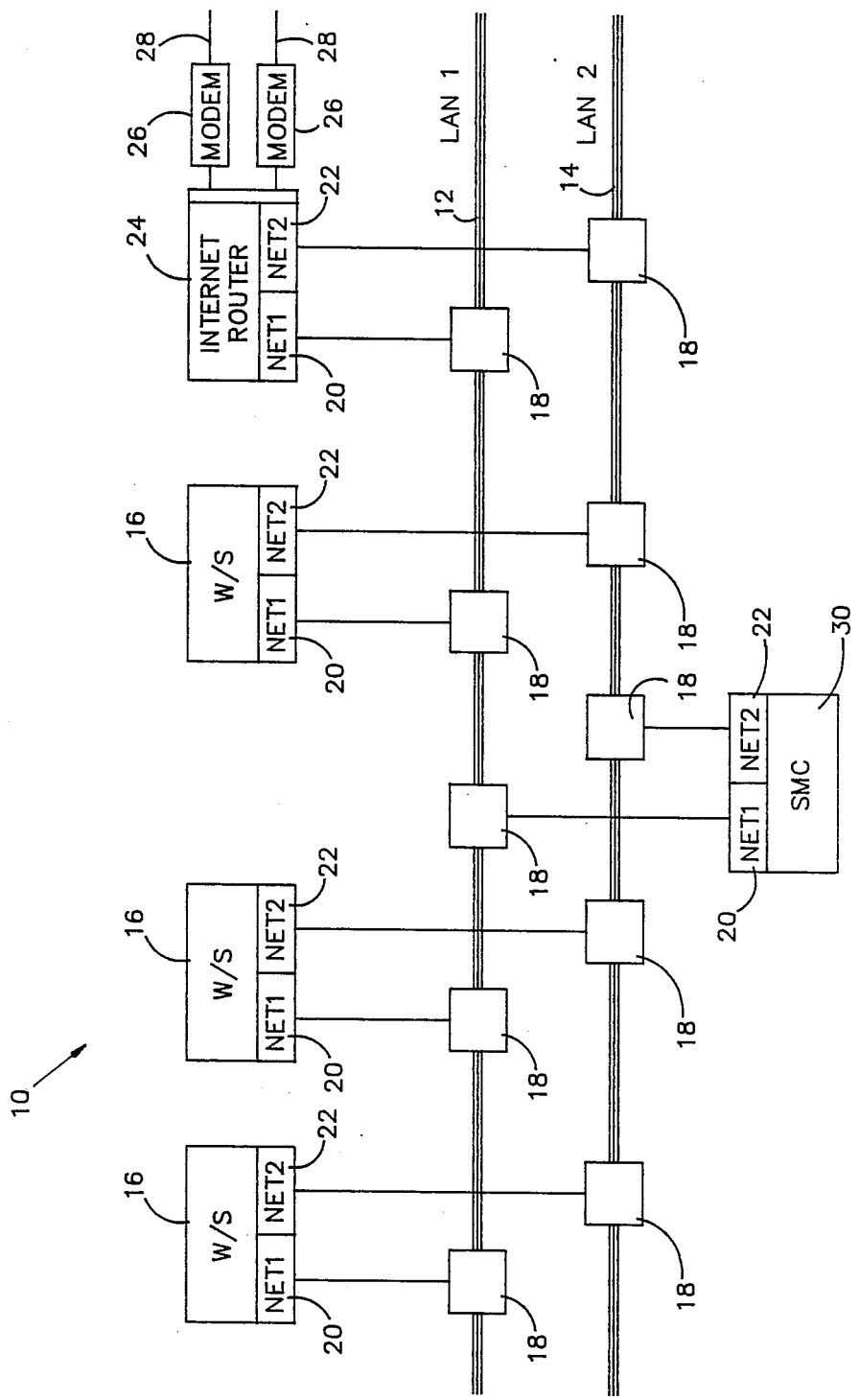
FIG. 1 is a simplified block diagram drawing of a prior art approach to a redundant local area network.
Figure 2:
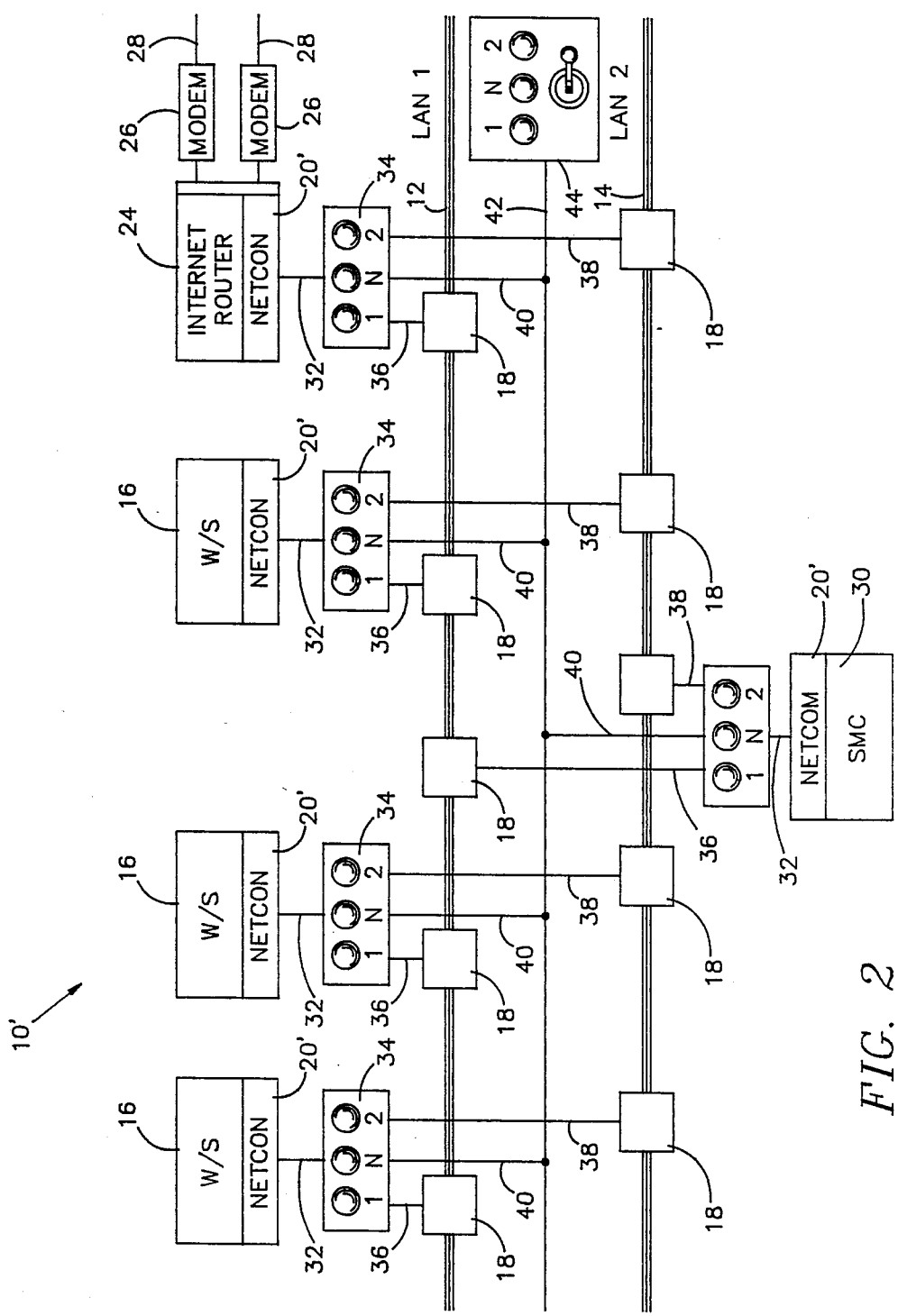
FIG. 2 is a simplified block diagram drawing of a redundant local area network according to the present invention in its most basic form.

FIG. 2 depicts the present invention in its most basic (and, therefore, non-preferred) form. It should be noted that in the descriptions hereinafter, only one type of interconnection between LANs is shown. It should be understood that the interconnect router is just an example of one type of LAN interconnection and does not preclude the use of any of the many other types of possible interconnections, such as bridges, repeaters, gateways, etc. The network 10 of FIG. 2 is an improvement over the prior art network 10 of FIG. 1; however, due to its generally manual nature, it falls short of the desired capability of rapidly and accurately identifying and isolating errors in the network. It is worth investigating briefly, however, since the changes incorporated therein form the basis for the preferred embodiment to be described shortly.

In network 10', each workstation 16 needs only one network interfacing transceiver board 20' in the usual and well known manner. The bidirectional output line 32 from the interfacing transceiver board 20' is connected as a bidirectional input to a three-position switch 34. Each switch 34 has one bidirectional output 36 connected to a interfacing transceiver 18 on LAN1 12 and a second output 38 connected to a interfacing transceiver 18 on LAN2 14. All the switches 34 are connected by a control line 40 to a master control line 42 which, in turn, is connected to a three-position manual switch 44. An internet router 24 and SMC 30 are, once again, provided and are connected in the same manner as the workstations 16. By using the manual switch 44, the workstations 16, internet router 24 and SMC 30 can be switched, collectively, from one LAN 12, 14 to the other or to a "neutral" position disconnected from either LAN. In addition, by using the individual switches 34, the workstations 16, internet router 24, and SMC 30 can be switched individually from one LAN 12, 14 to the other or to a neutral position disconnected from either LAN. As will be appreciated, the complexity in the workstations 16 and other components is reduced by this basic approach but, unfortunately, little improvement is made in the capability of monitoring the health of the network 10' over the prior art network 10 of FIG. 12 since the SMC 30 is not in control of the monitoring process. That is the very improvement implemented by the preferred embodiment which will now be described.

Figure 3:
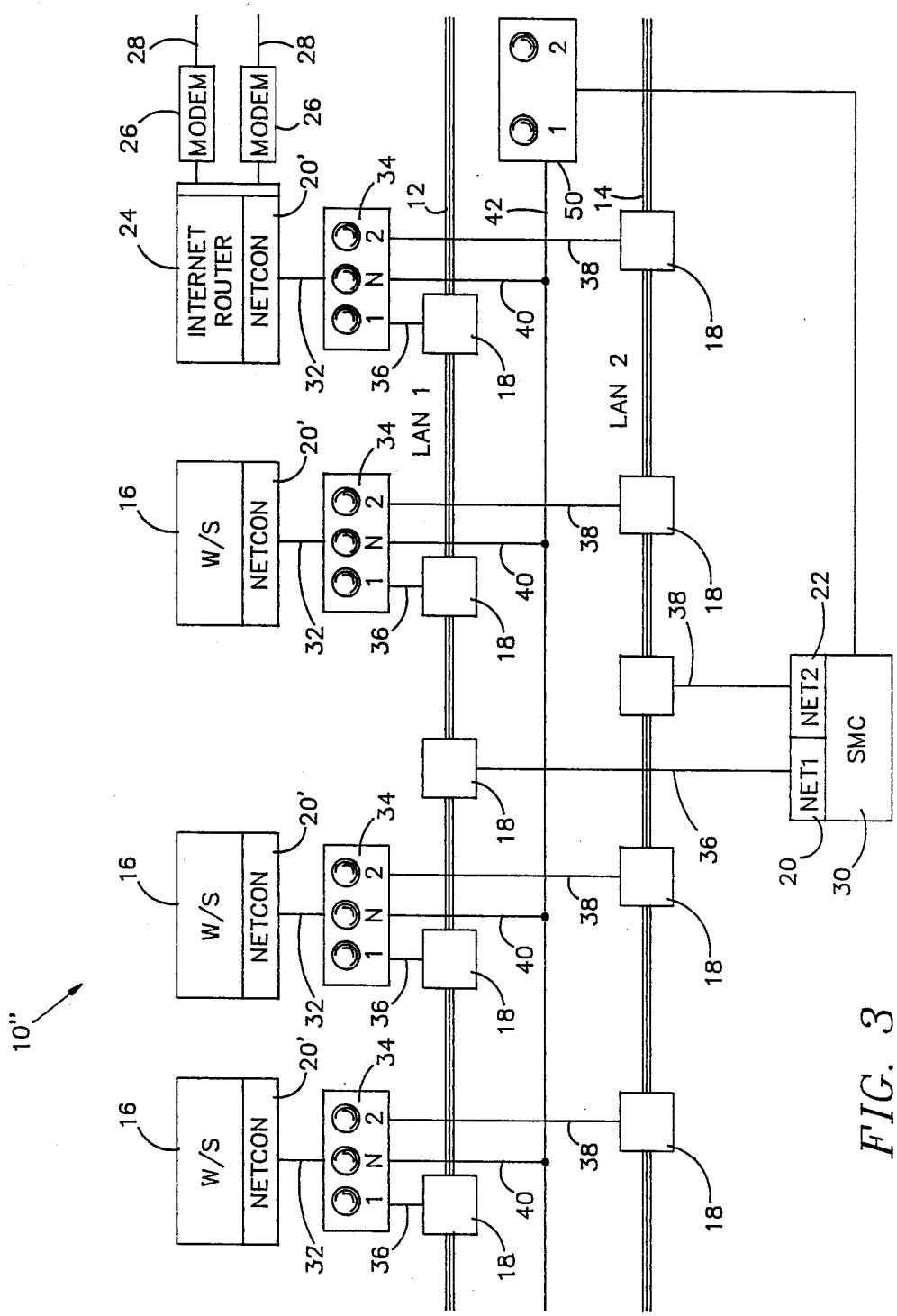
FIG. 3 is a simplified block diagram drawing of a redundant local area network according to the present invention in its preferred embodiment.

The preferred network of the present invention is generally indicated as 10" in FIG. 3. As in the basic network 10' of FIG. 2, the workstations 16 and internet router 24 have a single interfacing transceiver board 20' having a bidirectional output line 32 therefrom. Again, network 10" of the present invention employs a three-position slave switch 48 which will be discussed in greater detail shortly. As with the prior art network of FIG. 2, each slave switch 48 has its bidirectional output lines 36 and 38 connected to interfacing transceivers 18 on LANs 12, 14, respectively. Additionally, however, each slave switch 48 has a control line 40 input thereto which is connected to the master control line 42 which, in turn, is connected to a master switch 50 which will also be described in greater detail shortly. The master switch 50 has an input control line 2 which is connected to an SMC 30. Unlike the other nodes of the network 10", however, the SMC 30 of the present invention includes two network interfacing transceiver boards 20, 22 in the manner of the prior art network of FIG. 1. Thus, the SMC 30 is capable of simultaneously monitoring both LANs 12, 14. These two LANs, in the present invention, are concurrently active. As will be seen shortly, this permits a much broader and useful capability in the SMC 30 not possible with the prior art configuration of FIG. 1 as discussed above.

Figure 4:
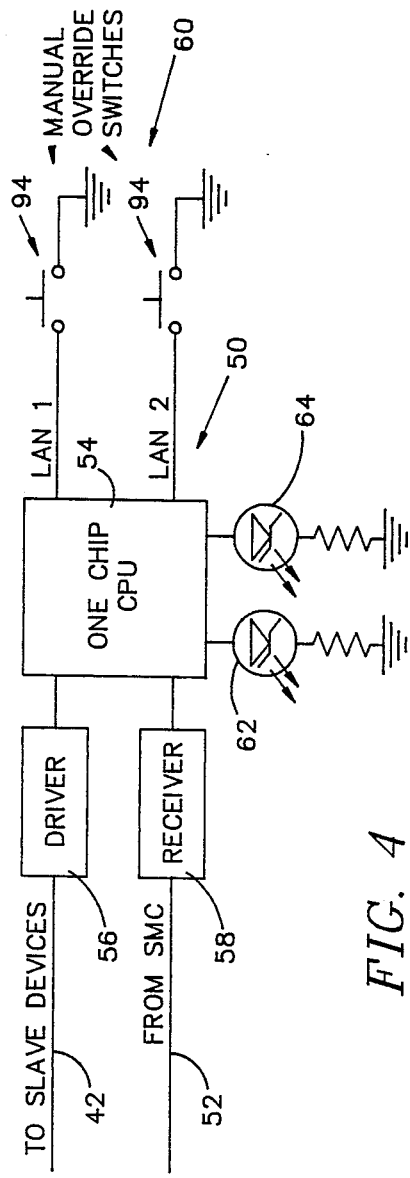
FIG. 4 is a simplified block diagram drawing of a computer controlled master switch as employed in the preferred embodiment of the present invention.

Turning now to FIG. 4, the master switch 50 of the present invention is shown therein in greater detail. Master switch 50 comprises a one-chip CPU 54 of a type well known in the art and generally available commercially which includes a memory (not shown) for holding the instructions to be executed thereby. An RS422, or similar, output driver 56 interfaces between the master control line 42 and one of the CPU's outputs as shown and is used to send signals to the slave switches 48 in a manner to be described shortly. An RS232, or similar, input receiver 58 interfaces between the CPU and the input control line 52 over which control signals are input by the SMC 30 to effect its various functions. It is preferred that manual override switches 60 be provided so that all the components on the network 10" can be connected to one of the LANs 12, 14 by manual override such as for maintenance, and the like. As a visual indication to the service personnel of the status of the system, LEDs 62, 64 are connected to be driven by the one-chip CPU 54 so as to indicate the presence of an output command to one LAN or the other. In the preferred configuration, LED 62 is red and indicates that all nodes have been commanded to switch to LAN1 12, while LED 64 is green and indicates a similar result with respect to LAN2 14. If either of the two LEDs is ON, it indicates a manual override status. Normally they will be OFF.

Figure 5:
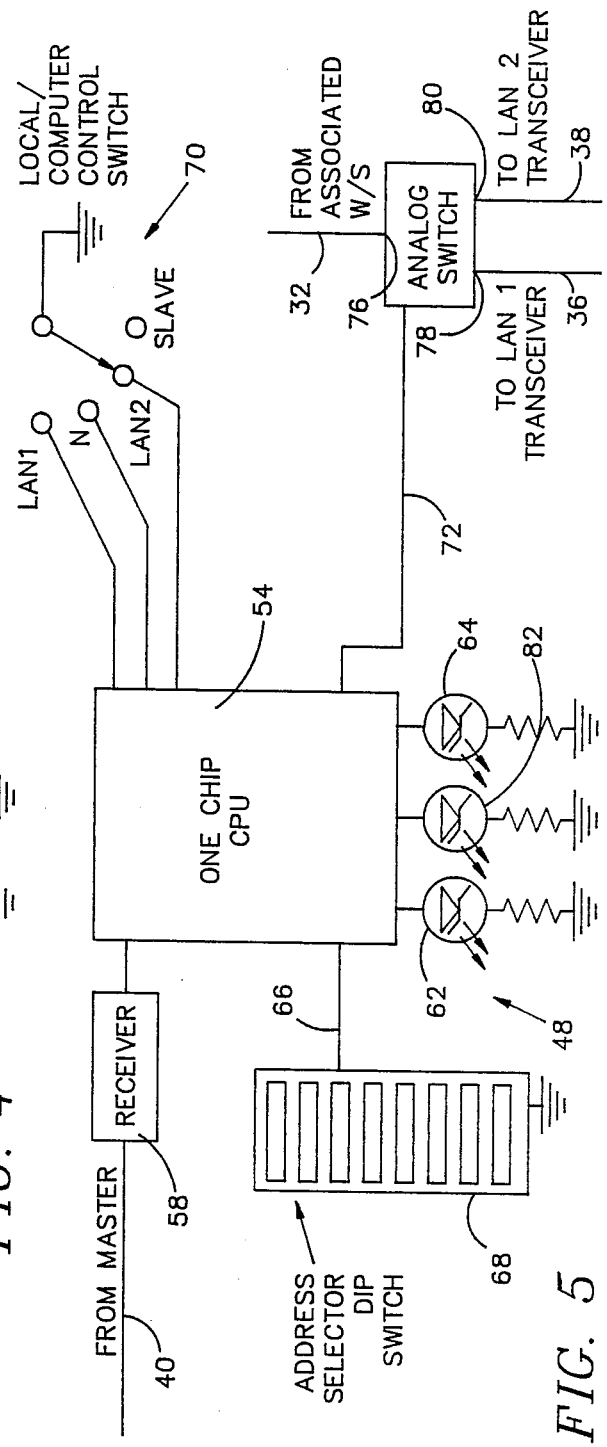
FIG. 5 is a simplified block diagram drawing of one of the slave switches employed in the preferred embodiment of the present invention.

Turning now to FIG. 5, one of the slave switches 48 of the present invention is shown therein in greater detail. As with the master switch 50, the heart of each slave switch 48 is a one-chip CPU 54. In this case, the input receiver 58 is connected to control line 40 which, it will be remembered, is connected to the master control line 42 connecting to the master switch 50 of FIG. 4. The one-chip CPU 54 is also connected over a multiple conductor cable 66 to an address selector DIP switch 68 which is used to provide each slave switch 48 with a unique address on the network 10". This, of course, is a technique well known in the art and forms no point of novelty within the present invention per se.

Each slave switch 48 is provided with a local/computer control switch 70 by which each slave switch 48 can be used to force connection to LAN1 12, LAN2 14 or a "neutral" (i.e., unconnected to either LAN) position. Note that for simplicity the multiconductor transceiver cable is shown as a single thick line and with flow described in only one direction, whereas the flow in some conductors therein is actually in the opposite direction. When switch 70 is in the "SLAVE" position, which is the default position, the slave switch 48 responds to signals on control line 40 originating the SMC 30. Each CPU 54 within a slave switch 48 is connected by line 72 to control the position of an analog switch 74 in a manner well known in the art. Each analog switch 74 has a single input 76 to which a multiple interfacing transceiver cable (i.e., line 32) from the associated device is connected. Each analog switch 74 has three positions. In a first position, the input 76 is connected to an output 78 to which the multiple conductor cable previously indicated as line 36 is connected so as to connect the associated device to the transceiver 18 of LAN1 12. In similar fashion, in a second position, the input 76 of analog switch 74 is connected to a second output 80 to which the multiple conductor cable previously indicated as line 38 is connected which, in turn, connects to the transceiver 18 of LAN2 14. In a third position, the input 76 of the analog switch 74 is not connected to either output 78, 80. This is the "neutral" position previously mentioned and completely disconnects the associated computing device from the network 10". The CPU 54 of each slave switch 48 is connected to drive three LEDs. LEDs 62 and 64 are red and green, respectively, and function in the same manner as the LEDs 62, 64 associated with the master switch 50. LED 82, in the preferred embodiment, is yellow and indicates that the slave switch 48 is in the neutral position.

Having thus described the basic changes to the network 10" of the present invention which make the objectives thereof possible, the details of additional equipment employed and the manner of monitoring the network's health will now be described.

Figure 6:
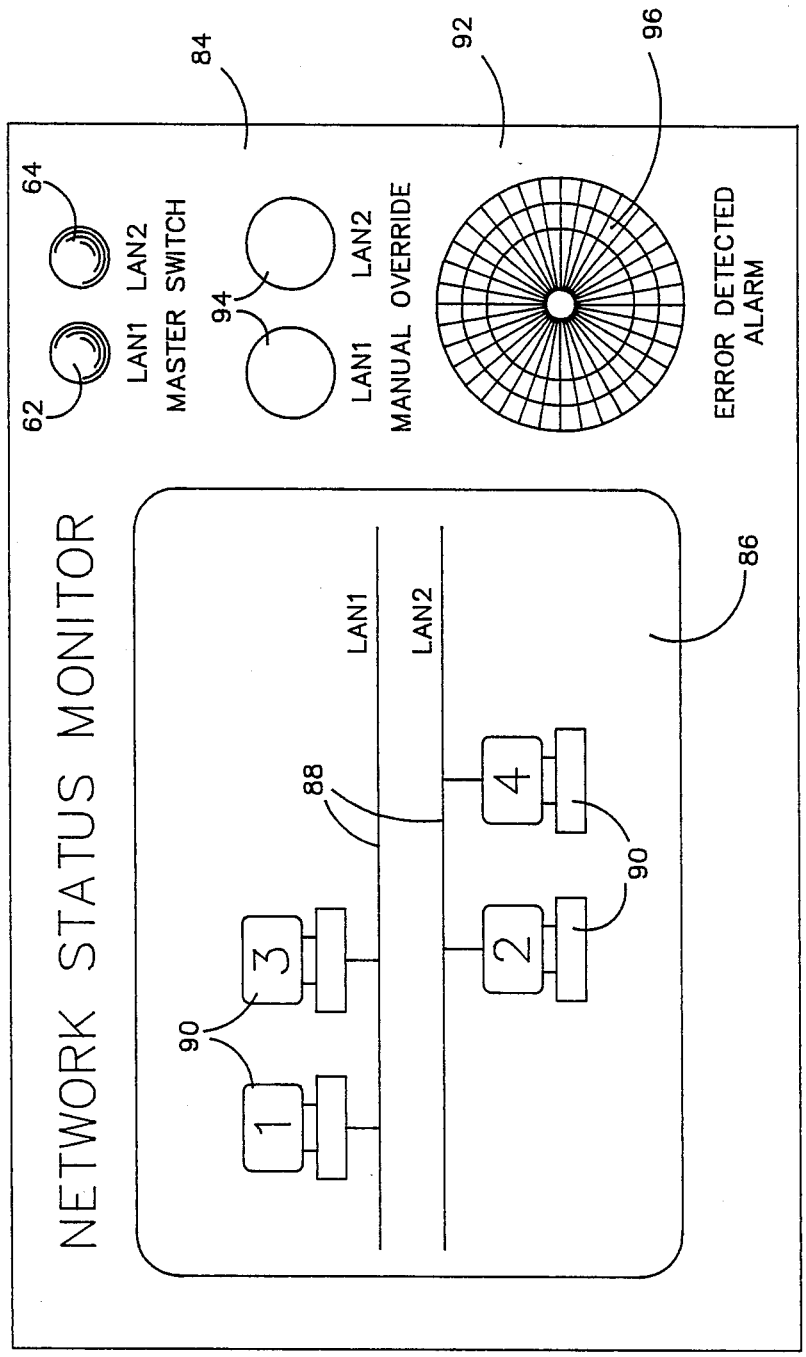
FIG. 6 is a simplified drawing of a Network Status Monitor as might be employed with a local area network according to the present invention to allow service personnel to monitor the health of the network.

Turning first to FIG. 6, a proposed Network Status Monitor (NSM) 84 is shown as might be employed with the present invention to allow service personnel to have a central location for determining the health of the network. Such a monitor is only suggested and is not necessary to the successful implementation of the present invention, of course, as the various components thereof could be disposed at various other locations if desired. The proposed NSM 84 is envisioned as being part of the SMC 30 and is intended to be located in the office of the network service personnel responsible for the maintenance of the network. The NSM 84 would include a display 86 showing the LANs 12, 14 and the connections of the workstations 16 thereto. The display 86 could be a cathode ray tube, a liquid crystal display panel, or the like. In a two LAN system, as is being described by way of example, it is preferred that the visual representations 88 of the LANs 12, 14 be used to separate the display 86 and that the visual representations 90 of the workstations 16 connected to a LAN 12, 14 be displayed on that side of the display. This allows instant recognition of the status of the network by the maintenance personnel. For example, in the drawing of FIG. 6, it is instantly apparent that workstations "1" and "3" are connected to LAN1 12 while workstations "2" and "4" are connected to LAN2 14. Should one or more of the representations 90 of the workstations start jumping from one LAN 12, 14 to the other, such condition would become instantly apparent to anyone watching the display 86 and indicate a possible problem at that workstation.

The LEDs 62, 64 of the master switch 50 could also be on the front panel 92 of the NSM for viewing by the maintenance personnel. Buttons 94 for operating the manual override switches 60 of master switch 50 could also be made available on panel 92 for operation by the maintenance personnel. Additionally, an audible alarm 96 which can be sounded by the SMC 30 could be conveniently included on panel 92 so that the SMC 30 could alert and advise the maintenance personnel of errors and problems detected such as by blinking the representation(s) of the problem area(s) on the display 86.

One of the advantages contemplated by the network 10″ of the present invention is the constant testing and use of the LANs 12, 14 so that there is never the situation where there is a need to switch to the "spare" LAN only to find it inoperative. To this end, the program logic of the SMC 30 in the present invention is designed to continually monitor the health of the network 10″. Both the SMC 30 and each component of the network 10″ (e.g. internet router 24, etc.) will have contained therein a pre-established message configuration (the "test message") for testing and verifying the network 10″ and its transmission capabilities. On a periodic basis, the SMC 30 will send the test message to each component on a particular LAN 12, 14 requesting confirmation of proper receipt thereof and re-transmission thereof back to the SMC 30. If the network 10″ and its components are healthy, this polling procedure will verify that each component can not only communicate to and from the LAN 12, 14 to which it is connected; but, additionally, do so in an apparently error-free manner.

Another function of the SMC 30 is to work as a gateway between LANs; that is, it routes all interLAN traffic transparently to the users. In other words, any computer connected to LAN1 12 can talk to any other connected to LAN2 14, and vice versa. In the preferred embodiment, the SMC 30 is adapted to take care of any required bridging between the two physical LANs 50, making them look as one simple LAN. The preferred SMC 30 is also adapted to detect two or more computers that sustain a substantial amount of dialogue between them and connect them to the same physical LAN if necessary, thus avoiding excessive load during its briding activity.

Since each of the slave switches 48 is individually addressable and the SMC 30 can monitor both LANs 12, 14 simultaneously, much error detection and isolation is possible that could not even be contemplated by prior art networks. For example, if one LAN fails, the SMC 30 can automatically switch all the nodes from one LAN 12, 14 to the other. Thus, if all the nodes were connected to LAN1 12, they would be switched to LAN2 14 without the loss of data if one of the popular error recovery protocols is used such as TCP/IP, ISO/OSI, etc. Note that this requires no modification to the prior art workstation hardware and software since those components only see one output and input address and are unaware of which LAN 12, 14 to which they are connected. Typically, prior art workstations and the like are set up to monitor their messages for an acknowledgement of receipt and to retransmit them if not acknowledged. Thus, upon the change of LANs by SMC 30, any messages that are lost during the transition will be retransmitted subsequently in the usual fashion.

The changing of LANs 12, 14 on a periodic basis by the SMC 30 will, of course, eliminate the non-working "spare" situation mentioned above and is of definite benefit. Further error detection and isolation is contemplated as part of the logic of the SMC 30, however. For example, assume that all the workstations "1-4" of FIG. 6 are connected to LAN1 12 and that as part of the polling of the workstations 16 (and other components) workstation "1" fails to respond to the poll. The logic of the SMC 30 then attempts to switch workstation "1" to LAN2 14 and communicate over LAN2 14. If this is successful, it indicates that the problem is between workstation "1" and its connection to LAN1 12. If not, the SMC 30 switches one of the other workstations (i.e. "2, 3 or 4") to LAN2 14 and sends it the test message. If that is successful, it verifies the operability of the master switch 50 and its associated connections and indicates that the error is in workstation "1" or its slave switch 48. If it is not successful, it indicates a problem with the master switch 50 and/or the master control line 42. In any event, these conditions are indicated to the maintenance personnel by sounding the alarm 96 and presenting an appropriate advisory display on the display 86 of the NSM 84. It is worthwhile to mention at this point that a partial or total failure of the proposed network of the invention does not constitute a total crash of the system, as it would with prior art networks in which any interruption of the LAN, such as a loose terminator, a short, etc. would take the entire system down and give no clues as to the cause. The reliability of the entire system is in all aspects substantially increased, therefore, by the network approach of the present invention.

While the exemplary description of the preferred embodiment above showed only two LANs 12, 14, the approach of the present invention can use additional LANs and obtain additional benefits by so doing. The most important benefit not possible with prior art LAN configurations is the providing of a priority structure; e.g. two machines of high priority could even be assigned to one private LAN by the SMC 30 in the network of the present invention.

Figure 7:
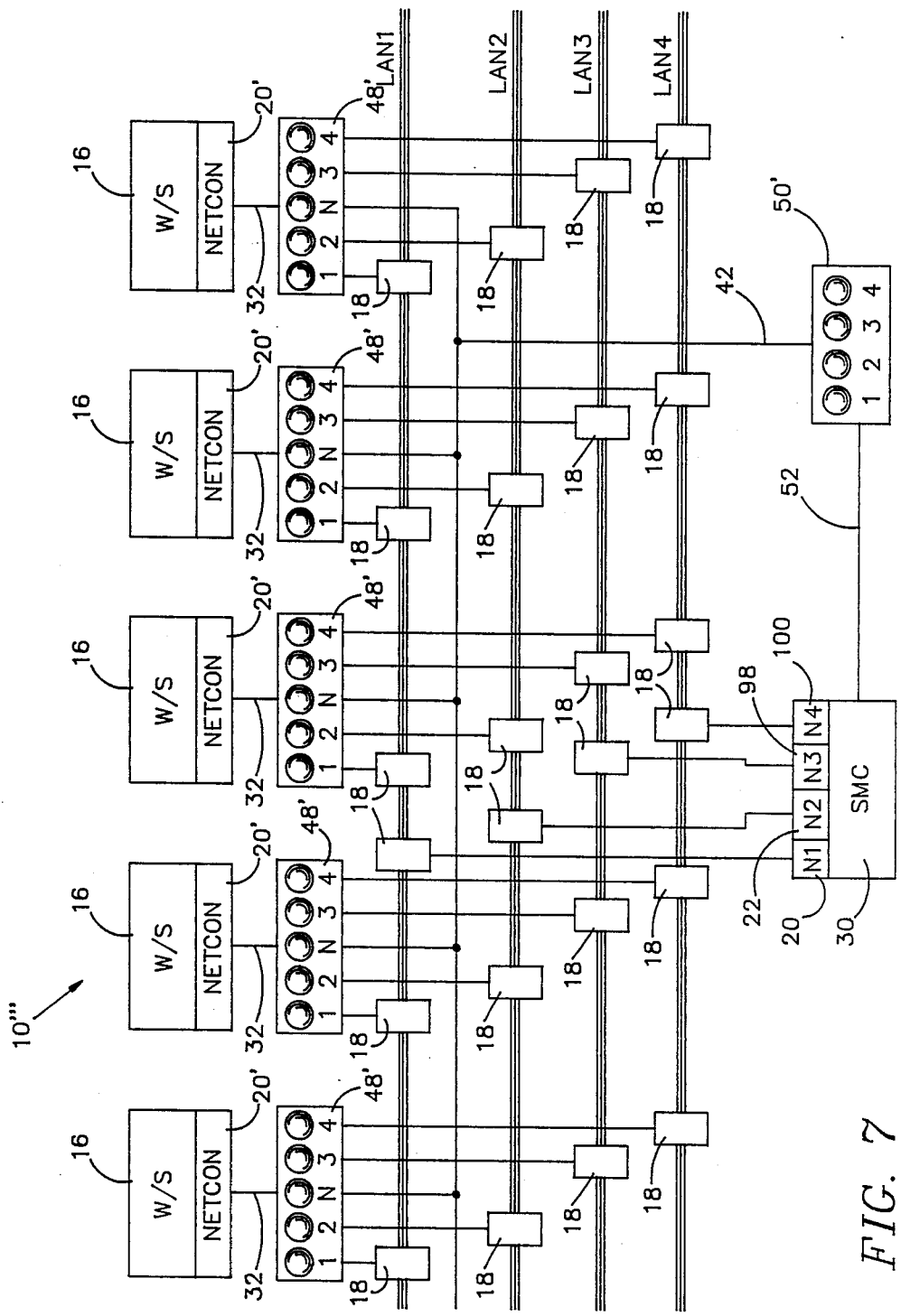
FIG. 7 is a simplified block diagram drawing of a redundant local area network according to the present invention in an alternate embodiment with a plurality of network cables and allowing priority levels within the network.

Turning now to FIG. 7, a network 10‴ according to the present invention is shown therein as having four LANs labelled LAN1, LAN2, LAN3 and LAN4, respectively. As in the previously described network 10″ according to the present invention, the workstations 16, and the like, are standard in nature and have their single output line 32 connected to a slave switch 48′. In this case, however, the slave switches 48 have five positions providing for connections to the four LANs plus a neutral position. Likewise, the master switch 50 has four positions and the SMC 30 includes four network connector boards 20, 22, 98, 100 to allow it to monitor each of the LANs and, additionally, function as a gateway or bridge between them, as described above for the two LAN embodiment. Other than that, the structure is virtually identical to that described above with respect to network 10″.

To provide a priority structure, the logic of the SMC 30 simply assigns the higher priority workstations 16, or the like, to a dedicated LAN (or LAN pair) with the bulk of the lower priority workstations sharing another LAN (or LAN pair). This approach can also be employed where several workstations, or the like, are transmitting secured data which is not to be available to others. By dedicating a LAN to these users, there is no simultaneous access to the data. In the event of a network malfunction, however, the SMC 30 can continue to shift the LAN(s) to which the high priority users are connected to assure that they continue in operation—even if it requires switching other lower priority users completely out of the network.

We claim:

1. In a local area networked computer system having a plurality of nodes each connected to a first network cable by an input/output line from a network connector board within the node to a first interfacing transceiver operably attached to the first network cable, the improvement for permitting more error-free operation of the networked computer system comprising:

(a) a second network cable disposed in parallel with the first cable, said second network cable including a plurality of second interfacing transceivers attached thereto;

(b) a plurality of three position switches each having a signal input, three outputs for individual selective connection to said input, and a control input for receiving signals designating which of said outputs is to be connected to said signal input, each of said switches including means for designating a response address for responding to addressed signals appearing at said control input, each of said switches further having its said signal input connected to a respective one of the input/output lines from the odes, one of said three outputs being connected to a respective one of the plurality of first interfacing transceivers, and another of said three outputs being connected to a respective one of said plurality of second interfacing transceivers;

(c) master switch control means having an output connected to said control inputs of said plurality of three position switches and an input for receiving directive signals for outputting addressed switch position signals to said three position switches; and, (d) monitor and control computer means having a pair of network connector boards therein connected to respective ones of one of the first interforcing transceivers and one of said second interfacing transceivers and an output connected to said input of said master switch means for monitoring the status of the networked computer system by sending messages to the nodes and receiving and verifying messages therefrom and for sending control signals to said master switch to cause said master switch to cause respective ones of the nodes to use a desired one of the first cable and said second cable for transmitting and receiving messages and for disconnecting desired ones of the nodes from both cables.

2. The improvement to a local area networked computer system of claim 1 wherein:
said plurality of three position switches each includes indicator means for indicating which of said outputs is presently connected to said signal input.

3. The improvement to a local area networked computer system of claim 1 wherein:
said master switch control means includes indicator means for indicating which of said outputs of said plurality of three position switches is presently being commanded to be connected to said signal input.

4. The improvement to a local area networked computer system of claim 1 wherein:
said monitor and control computer means includes gateway program logic means between the first cable and said second cable for sensing messages being transmitted from one cable to the other and for bridging said messages between the first cable and said second cable.

5. The improvement to a local area networked computer system of claim 4 wherein:
said gateway program logic means includes means for sensing excessive gateway activity between nodes on different cables and for switching said nodes to the same cable to reduce gateway activity therebetween.

6. The improvement to a local area networked computer system of claim 1 wherein:
said monitor and control computer means includes network status monitor means for displaying to service personnel the present connections of the nodes to the cables.

7. The improvement to a local area networked computer system of claim 6 wherein:
said network status monitor means includes means for service personnel to override said master switch control means and manually connect and disconnect selected ones of the nodes to and from a selected cable.

8. The improvement to a local area networked computer system of claim 6 wherein:
said network status monitor means includes indicator means for indicating which of said outputs of said plurality of three position switches is presently being commanded via said master switch control means to be connected to said signal input.

9. In a local area networked computer system having a plurality of nodes each connected to a first network cable by an input/output line from a network connector board within the node to a first interfacing transceiver operably attached to the first network cable, the improvement for permitting more error-free operation of the networked computer system comprising:

(a) a second network cable disposed in parallel with the first cable, said second network cable including a plurality of second interfacing transceivers attached thereto;

(b) a plurality of three position switches each having a signal input, three outputs for individual selective connection to said input, and a control input for receiving signals designating which of said outputs is to be connected to said signal input, each of said switches further having its said signal input connected to a respective one of the input/output lines from the nodes, one of said three outputs being connected to a respective one of the plurality of first interfacing transceivers, and another of said three outputs being connected to a respective one of said plurality of second interfacing transceivers; and, (c) master switch control means having an output connected to said control inputs of said plurality of three position switches for outputting switch position signals to said three position switches.

10. The improvement to a local area networked computer system of claim 9 wherein:

(a) each of said switches includes means for designating a response address for responding to addressed signals appearing at said control input;

(b) said master switch control means includes an input for receiving directive signals; and additionally comprising, (c) monitor and control computer means having a pair of network connector boards therein connected to respective ones of one of the first interfacing transceivers and one of said second interfacing transceivers and an output connected to said input of said master switch means for monitoring the status of the networked computer system by sending messages to the nodes and receiving and verifying messages therefrom and for sending control signals to said master switch to cause said master switch to cause respective ones of the nodes to use a desired one of the first cable and said second cable for transmitting and receiving messages and for disconnecting desired ones of the nodes from both cables.

11. The improvement to a local area networked computer system of claim 10 wherein:

said monitor and control computer means includes gateway program logic means between the first cable and said second cable for sensing messages being transmitted from one cable to the other and for bridging said messages between the first cable and said second cable.

12. The improvement to a local area networked computer system of claim 11 wherein:

said gateway program logic means includes means for sensing excessive gateway activity between nodes on different cables and for switching said nodes to the same cable to reduce gateway activity therebetween.

13. The improvement to a local area networked computer system of claim 10 wherein:

said monitor and control computer means includes network status monitor means for displaying to service personnel the present connections of the nodes to the cables.

14. The improvement to a local area networked computer system of claim 13 wherein:

said network status monitor means includes means for service personnel to override said master switch control means and manually connect and disconnect selected ones of the nodes to and from a selected cable.

15. The improvement to a local area networked computer system of claim 13 wherein:

said network status monitor means includes indicator means for indicating which of said outputs of said plurality of three position switches is presently being commanded via said master switch control means to be connected to said signal input.

16. The improvement to a local area networked computer system of claim 9 wherein:

said plurality of three position switches each includes indicator means for indicating which of said outputs is presently connected to said signal input.

17. The improvement to a local area networked computer system of claim 9 wherein:

said master switch control means includes indicator means for indicating which of said outputs of said plurality of three position switches is presently being commanded to be connected to said signal input.

18. A redundant error-detecting and correcting local area networked computer system having a plurality of nodes each including a network connector board within the node for connecting to an interfacing transceiver operably attached to a network cable, said system comprising:

(a) a first network cable disposed along a path to interconnect the nodes, said first network cable including a plurality of first interfacing transceivers attached thereto;

(b) a second network cable disposed in parallel with said first cable, said second network cable including a plurality of second interfacing transceivers attached thereto;

(c) a plurality of three position switches each having a signal input, three outputs for individual selective connection to said input, and a control input for receiving signals designating which of said outputs is to be connected to said signal input, each of said switches including means for designating a response address for responding to addressed signals appearing at said control input, each of said switches further having its said signal input connected to a respective one of the input/output lines from the nodes, one of said three outputs being connected to a respective one of said plurality of first interfacing transceivers, and another of said three outputs being connected to a respective one of said plurality of second interfacing transceivers;

(d) master switch control means having an output connected to said control inputs of said plurality of three position switches and an input for receiving directive signals for outputting addressed switch position signals to said three position switches; and, (e) monitor and control computer means having a pair of network connector boards therein connected to respective ones of one of said first interfacing transceivers and one of said second interfacing transceivers and an output connected to said input of said master switch means for monitoring the status of the networked computer system by sending messages to the nodes and receiving and verifying messages therefrom and for sending control signals to said master switch to cause said master switch to cause respective ones of the nodes to use a desired one of said first cable and said second cable for transmitting and receiving messages and for disconnecting desired ones of the nodes from both cables.

19. The improved local area networked computer system of claim 18 wherein:

said plurality of three position switches each includes indicator means for indicating which of said outputs is presently connected to said signal input.

20. The improved local area networked computer system of claim 18 wherein:

said master switch control means includes indicator means for indicating which of said outputs of said plurality of three position switches is presently being commanded to be connected to said signal input.

21. The improved local area networked computer system of claim 18 wherein:

said monitor and control computer means includes gateway program logic means between said first cable and said second cable for sensing messages being transmitted from one cable to the other and for bridging said messages between said first cable and said second cable.

22. The improved local area networked computer system of claim 21 wherein:
said gateway program logic means includes means for sensing excessive gateway activity between nodes on different cables and for switching said nodes to the same cable to reduce gateway activity therebetween.

23. The improved local area networked computer system of claim 18 wherein:
said monitor and control computer means includes network status monitor means for displaying to service personnel the present connections of the nodes to said cables.

24. The improved local area networked computer system of claim 23 wherein:
said network status monitor means includes means for service personnel to override said master switch control means and manually connect and disconnect selected ones of the nodes to and from a selected cable.

25. The improved local area networked computer system of claim 23 wherein:
said network status monitor means includes indicator means for indicating which of said outputs of said plurality of three position switches is presently being commanded via said master switch control means to be connected to said signal input.

26. A redundant error-detecting and correcting local area networked computer system having a plurality of nodes each including network connector means within the node for connecting to an interfacing transceiver operably attached to a network cable, said system comprising:
 (a) a first network cable disposed along a path to interconnect the nodes, said first network cable including a plurality of first interfacing transceivers attached thereto;
 (b) a second network cable disposed in parallel with said first cable, said second network cable including a plurality of second interfacing transceivers attached thereto;
 (c) a plurality of three position switches each having a signal input, three outputs for individual selective connection to said input, and a control input for receiving signals designating which of said outputs is to be connected to said signal input, each of said switches including means for designating a response address for responding to addressed signals appearing at said control input, each of said switches further having its said signal input connected to a respective one of the input/output lines from the nodes, one of said three outputs being connected to a respective one of said plurality of first interfacing transceivers, and another of said three outputs being connected to a respective one of said plurality of second interfacing transceivers; and,
 (d) master switch control means having an output connected to said control inputs of said plurality of three position switches for outputting switch position signals to said three position switches.

27. The improved local area networked computer system of claim 26 wherein:
 (a) each of said switches includes means for designating a response address for responding to addressed signals appearing at said control input;
 (b) said master switch control means includes an input for receiving directive signals; and additionally comprising,
 (c) monitor and control computer means having a pair of network connector means therein for connecting to respective ones of one of the first interfacing transceivers and one of said second interfacing transceivers and an output connected to said input of said master switch means for monitoring the status of the networked computer system by sending messages to the nodes and receiving and verifying messages therefrom and for sending control signals to said master switch to cause said master switch to cause respective ones of the nodes to use a desired one of the first cable and said second cable for transmitting and receiving messages and for disconnecting desired ones of the nodes from both cables.

28. The improved local area networked computer system of claim 27 wherein:
said monitor and control computer means includes gateway program logic means between the first cable and said second cable for sensing messages being transmitted from one cable to the other and for bridging said messages between the first cable and said second cable.

29. The improved local area networked computer system of claim 28 wherein:
said gateway program logic means includes means for sensing excessive gateway activity between nodes on different cables and for switching said nodes to the same cable to reduce gateway activity therebetween.

30. The improved local area networked computer system of claim 27 wherein:
said monitor and control computer means includes network status monitor means for displaying to service personnel the present connections of the nodes to the cables.

31. The improved local area networked computer system of claim 30 wherein:
said network status monitor means includes means for service personnel to override said master switch control means and manually connect and disconnect selected ones of the nodes to and from a selected cable.

32. The improved local area networked computer system of claim 30 wherein:
said network status monitor means includes indicator means for indicating which of said outputs of said plurality of three position switches is presently being commanded via said master switch control to be connected to said signal input.

33. The improved local area networked computer system of claim 26 wherein:
said plurality of three position switches each includes indicator means for indicating which of said outputs is presently connected to said signal input.

34. The improved local area networked computer system of claim 26 wherein:
said master switch control means includes indicator means for indicating which of said outputs of said plurality of three position switches is presently being commanded to be connected to said signal input.

35. The method of operating a local area network having simultaneously operating first and second communications paths for the transfer of messages between a plurality of nodes selectively connectable to either of the paths to provide better and more reliable operation of the network comprising the steps of:

(a) monitoring the messages on the paths independent of the nodes to identify messages requiring bridging between nodes connected to one path and nodes connected to the other path; and, (b) when the number of messages between a pair of nodes requiring bridging exceeds a preset limit during a pre-established period, connecting the pair of nodes to the same path to reduce the amount of bridging required.

36. The method of operating a local area network having simultaneously operating first and second communications paths for the transfer of messages between a plurality of nodes selectively connectable to either of the paths to provide better and more reliable operation of the network comprising the steps of:

(a) connecting the nodes to the two paths in substantially equal numbers so that the message traffic between the nodes is split between the two paths and both paths are always active;

(b) periodically sending, receiving, and verifying pre-established messages with all the nodes on the paths from an independent control computer to verify that the network is still operating normally and accurately.

37. The method of operating a local area network of claim 36 and additionally comprising the steps of:

(a) switching a node that does not properly send and receive the pre-established message to the other path;

(b) repeating the sending and receiving of the pre-established message with the switched node to verify if the node or its connection to the network is improperly functioning;

(c) notifying maintenance personnel of a node malfunction if the pre-established message is not properly sent over the other path; and, (d) notifying maintenance personnel of a network connection malfunction if the pre-established message is properly sent over the other path 38. The method of operating a local area network having a plurality of simultaneously operating communications paths for the transfer of messages between a plurality of nodes selectively connectable to any one of the paths to provide better and more reliable operation of the network comprising the steps of:

(a) monitoring the messages on the paths independent of the nodes to identify the sending and receiving nodes of the messages; and, (b) when the number of messages between a plurality of nodes exceeds a preset limit during a pre-established time period, transferring that plurality of nodes to a dedicated path not shared with other nodes.

39. The method of operating a local area network of claim 38 wherein:

said step (a) thereof includes monitoring for nodes designated as high priority nodes and switching high priority nodes to a common path not shared with other non-high priority nodes.

* * * * *